March 27, 1945.  N. P. BILLING  2,372,247
PROPELLER DRIVE FOR MARINE VESSELS
Filed Aug. 21, 1942  2 Sheets-Sheet 1
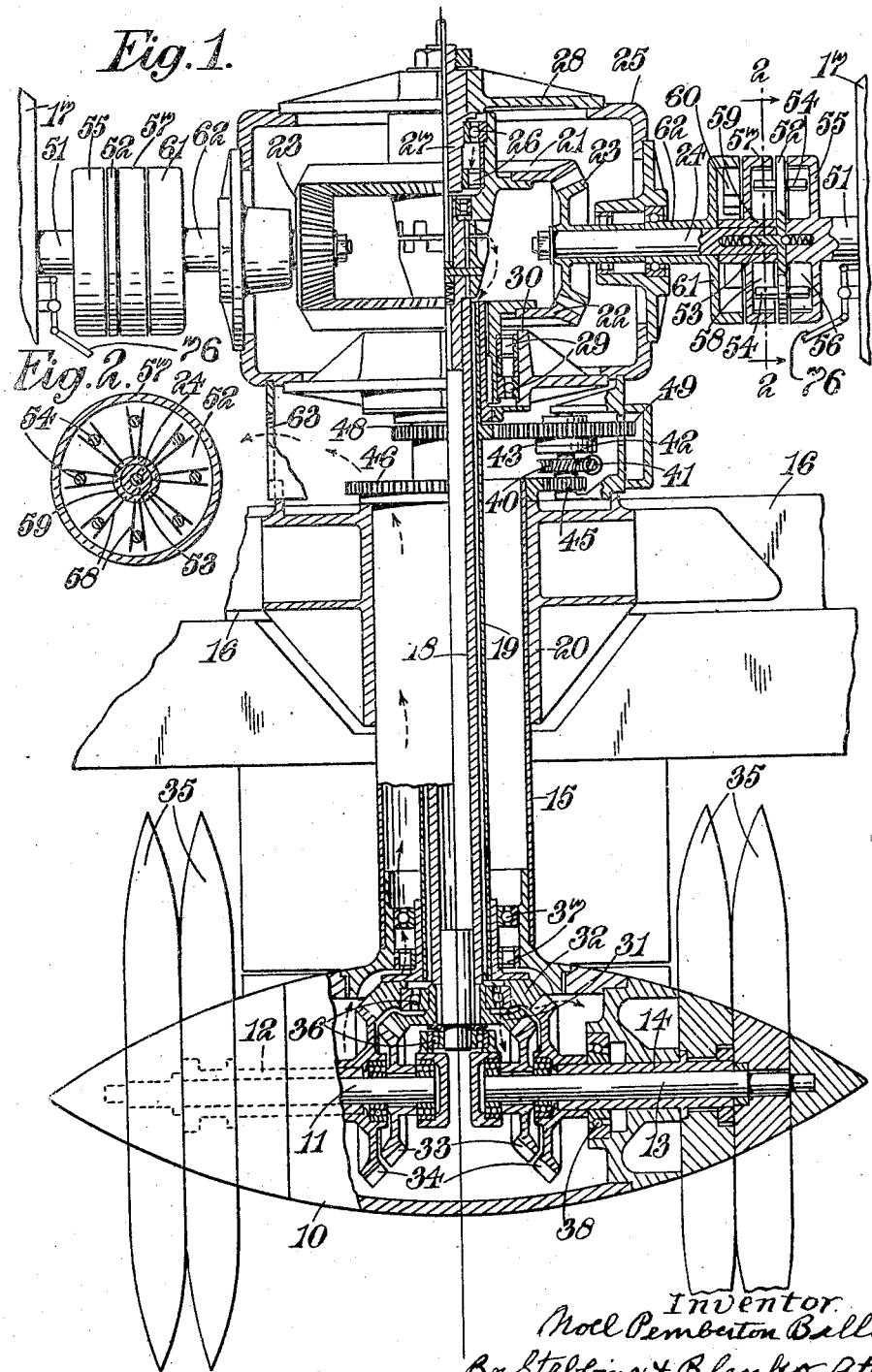
Inventor.
Noel Pemberton Billing
By Stebbins & Blenko, Attys.

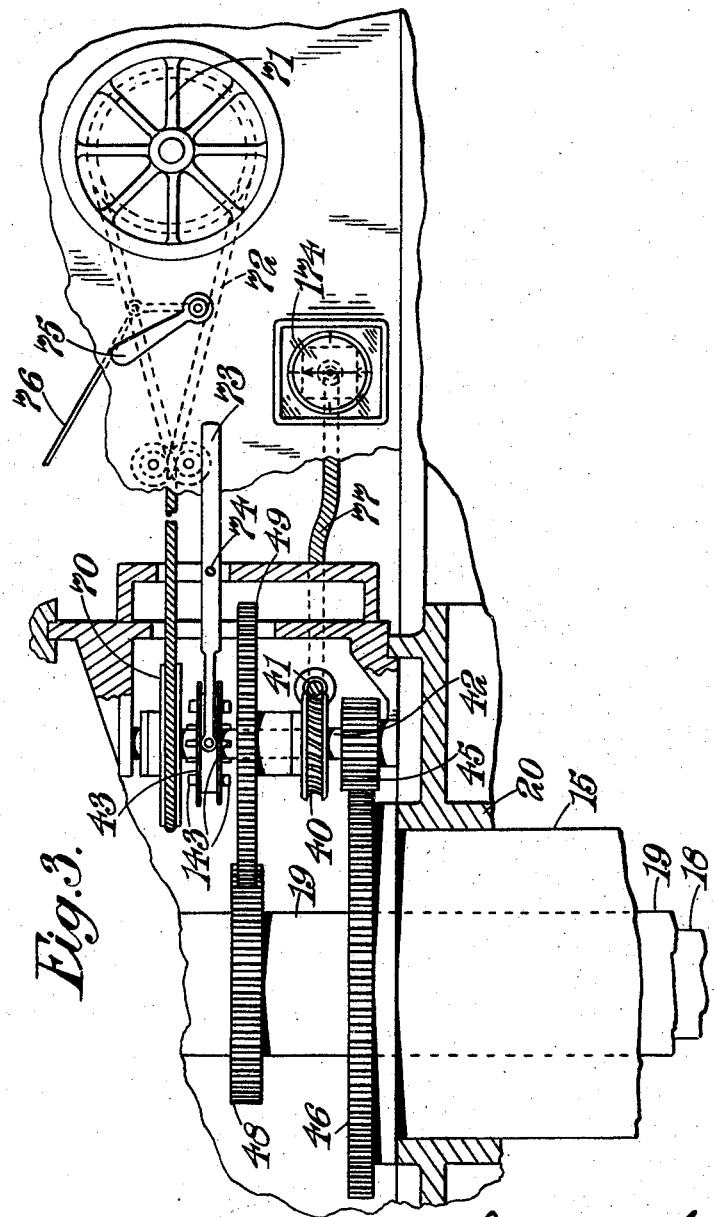

Patented Mar. 27, 1945

2,372,247

UNITED STATES PATENT OFFICE 2,372,247

PROPELLER DRIVE FOR MARINE VESSELS

Noel Pemberton Billing, Kingston Hill, England

Application August 21, 1942, Serial No. 455,638
In Great Britain August 21, 1941

15 Claims. (Cl. 115—35)

This invention consists in improvements in or relating to propeller drive for marine vessels and comprises means which will eliminate steering gear and reversing gear.

The invention is applied to that type of propeller drive in which the propellers are carried by a rotatable mounting in order that the propeller shaft may be turned about an axis at right angles to its own axis to enable the turning of the propeller axis to steer the vessel.

According to the present invention, propeller driving means comprises in combination at least two coaxial propeller shafts, two coaxial transmission shafts, the axis of which is transverse to that of the propeller shafts, means for driving the transmission shafts in opposite directions and other means coupling them respectively with the propeller shafts to rotate the latter in opposite directions and a mounting for the transmission and propeller shafts rotatable about the axis of the transmission shafts.

Preferably, the mounting for the transmission and propeller shafts is rotatable at will either continuously or partially in either direction.

In a preferred construction there are two pairs of coaxial propeller shafts whereof one pair is in axial alignment with the other pair and a driving coupling is provided between one of the transmission shafts and one of each such pair of propeller shafts to drive them in opposite directions, and another driving coupling is provided between the other transmission shaft and the other propeller shafts to drive them also in opposite directions whereby the propellers considered from one end of the propeller axis to the other are driven alternately left- and right-handedly.

Conveniently, the rotatable mounting comprises a turning shaft by which the mounting is rotated either continuously or partially at will and a power drive is applied to the turning shaft. For example, the transmission shafts are conveniently encased in a tubular housing which at its lower end is attached to a double-ended streamline housing enclosing the propeller shafts. The propeller bosses conveniently constitute component parts of the streamline housing.

The turning shaft may be power-driven from the same power unit or units by which power is transmitted to the propeller shaft or shafts.

One purpose of driving pairs of propellers in opposite directions through a pair of transmission shafts which also rotate in opposite directions is to cancel out or substantially cancel out engine and transmission torques. Also the oppositely rotating pairs of propellers serve to cancel out hydraulic torque and consequently the turning shaft or its equivalent can be rotated in either direction without impediment. A further purpose of the present invention is that if the turning shaft is continuously rotated in either direction the propeller shafts can be allowed to idle but no propulsion of the vessel will occur while the turning shaft is thus rotating. When, however, it is desired that the vessel should be moved, rotation of the turning shaft can be arrested with the axis of the propeller shafts in any desired relationship to the fore and aft center line of the craft so that the latter will commence to move in a direction depending upon the angular position at which the turning shaft has been arrested. Moreover, the turning shaft can be moved partially and to a required extent in one direction or the other for steering purposes.

By employing two pairs of oppositely rotating propellers at opposite ends of the propeller shaft housing with the propellers of each pair close together, it is found that, considering the propellers in order from the sternmost one, the sternmost or No. 1 propeller is working under normal conditions. No. 2 propeller which is close to it but rotates in an opposite direction is operating in swirling water leaving No. 1 propeller and can be so designed that the stream passing from it towards No. 3 propeller is again straightened, whereupon propellers Nos. 3 and 4 again operate in a manner analogous to that of propellers Nos. 1 and 2. Such advantageous conditions could not exist in the case in which only two oppositely rotating propellers are employed situated at opposite ends of a propeller mounting and spaced at a comparatively large distance from one another, that is to say, at a large distance compared with that of adjacent pairs of propellers in accordance with the present invention. Consequently, when only a single pair of oppositely rotating propellers is employed spaced well apart, hydraulic balance is not obtained at the two ends of the propeller boss and consequently rotation of a turning shaft by which the propeller mounting is supported becomes much more difficult in one direction that in the other. Such condition, however, does not apply in the construction according to the present invention.

The mounting for the transmission and propeller shafts conveniently comprises a turning shaft to which either a power or manual drive can be applied and this is combined with an indicator and means coupling the indicator to the turning shaft so that the angular position of the latter in relation to the fore and aft center line of the vessel will be shown. Moreover, the gearing coupling the power unit or units with the transmission and propeller shafts and with the turning shaft can be so selected that the indicator serves not only to show the angular relationship between the turning shaft and the fore and aft center line of the vessel but also the position of the propellers about their axis of rotation. This is of importance when it is desired to arrest the propellers so that they extend laterally of the axis when the vessel is drawing into shallow water or is actually grounding.

In order that the invention may be more clearly understood, a preferred example will now be described with the aid of the accompanying drawings, in which—

Figure 1 is a central section showing a complete propeller drive unit in a plane containing the axis for the driving shafts, Figure 2 is a section on the line 2—2 of Figure 1, and Figure 3 drawn to an enlarged scale is a view similar to Figure 1 of a detail thereof, these details including minor modifications only.

Like reference numerals indicate like parts in the several figures of the drawings.

At the lower end of the unit there is a streamline housing 10 in which two pairs of propeller shafts are arranged in alignment. The shafts of each pair are arranged one within the other and are indicated by the reference numerals 11, 12 on the left-hand side of the figure, and 13, 14 on the right-hand side thereof.

The housing 10 is carried at the lower end of a more or less vertical tubular support 15 extending downwardly through the hull of the vessel near the stern thereof, structural parts of the vessel by which the unit is supported being indicated at 16. These parts may be, for instance, engine bearers for engines diagrammatically indicated in outline at 17. In the tubular support 15 and at right angles to the axis of the propeller shafts already mentioned are two coaxial transmission shafts 18 and 19. The tubular support 15 is attached to the housing 10 in any preferred manner and is journalled in a bearing indicated at 20 so that it can turn about its axis and will constitute a turning shaft whereby the propeller housing can be rotated at will, in either one direction or the other, about the axis of member 15. The details of attachment of the housing 10 to the member 15 and of the formation of the bearing member 20 and other bearing supports by which the member 15 is rotatably carried are not shown in detail as these may conform to any preferred arrangements desired.

The transmission shafts 18 and 19 have secured to them at their upper ends bevel gears 21 and 22 respectively between which there are arranged, to engage both bevel gears simultaneously, bevel pinions 23 each mounted on the driving shaft 24 of an engine 17. There may be as many engine units disposed around the axis of the shafts 18 and 19 as may be desired and these units will conveniently be equidistantly spaced around that axis and these engines may all serve together to drive the propellers or a selected engine or engines only may be used for this purpose at any particular time.

The bevel gearing just described is enclosed in a casing 25 and bearings are indicated at 26 for supporting the inner shaft 18 from a central fixed bearing supporting member 27, which latter is secured within a removable top cover 28 for casing 25.

Other bearings 29 are shown for the upper end of the outer shaft 19 between a part carried by that shaft and a fixed tubular member 30 extending into the casing 25 from the lower cover thereof.

To the lower end of the transmission shafts 18 and 19 are secured bevel gears 31 and 32 respectively. Bevel gear 31 meshes with other bevel gears 33 one on each of the shafts 11 and 13 respectively and bevel gear 32 meshes with other bevel gears 34 mounted on the shafts 12 and 14 respectively. The propeller shafts will therefore all be driven at the same speed but corresponding shafts such as 11 and 13 or 12 and 14 respectively will be driven in opposite directions and, moreover, the two shafts in each pair will be driven in directions opposite to one another. Propellers 35 are mounted one on each of the propeller shafts 11 to 14 and in each pair the propellers will be respectively left- and right-handed.

Bearings are indicated at 36 for the lower end of shaft 18 and at 37 for the lower end of shaft 19, and other bearings 38 are shown for the mounting of the propeller shafts.

Assuming that one or more of the power units 17 is transmitting power to the propeller shafts through the connections above described the propeller housing 10 can, owing to the absence of torque reaction, be turned about the axis of the support 15 with ease and in consequence the propeller unit can be used not only for propulsion of the vessel but also for steering.

The mechanism comprises a worm wheel 40 mounted near the upper end of the member 15 and a worm 41 by which the worm wheel 40 can be rotated as required. The latter is shown as mounted on a spindle 42 to rotate with that spindle. Rotating also with the spindle 42 is a spur wheel 45 in mesh with ring gear 46 secured to the upper end of member 15. Secured to shaft 19 is a spur wheel 48 which is in mesh with another gear 49 which is free to rotate on spindle 42 and a clutch indicated as a whole by the reference numeral 43 permits gear 49 to be clutched to spindle 42 when desired.

In Figure 3 this mechanism is shown in greater detail but in a slightly modified form which will give a clearer understanding of the manner in which it is intended to work. The modified details as shown in Figure 3 are merely for the purpose of illustration and clarification and constitute no part of the present invention. In this figure the clutch 43 is shown as a dog-clutch the movable element of which is splined to spindle 42 and has clutching teeth to be engaged at will either with corresponding elements in the hub of gear 49 or in that of a pulley 70 controlled by a remotely positioned steering wheel 71. In the drawings the steering wheel and pulley 70 are shown as coupled by a cable 72 although it will be understood that any other means may be employed. The movable clutch member is actuated by a lever 73 pivoted at 74.

Thus, when the clutch is operative to couple gear 49 to spindle 42, housing 10 will be positively rotated by power transmitted through transmission shaft 19. Alternatively, however, the position of the clutch can be changed to couple steering wheel 71 directly with the spindle 42 of worm wheel 40, whereupon turning shaft 15 can be rotated by means of the steering wheel 71 so that the steering of the craft can be controlled by hand. The lever 73 or its equivalent is conveniently operated from a position close to steering wheel 71 so that when the vessel is to remain stationary the turning shaft 15 can be caused to rotate continuously from gear 48 through gear 49 clutched to spindle 42. The propeller housing then will be slowly rotated about the axis of the transmission shafts and no movement in any particular direction will be imparted to the vessel. When, however, the vessel is to proceed, clutch 43 can be thrown over when indicator 174 which is driven by worm 41 shown with the propeller housing 10 has been rotated relatively to the fore and aft center line of the vessel to the desired position and steering can then be effected from the steering wheel 71 through gears 45 and 46.

Although all the power units such as 17 are intended to rotate at synchronous speeds, means is provided to accommodate hunting due to a small lack of synchronisation. This means comprises a coupling between the engine drive shaft 24 to which is secured the bevel wheel 23 and a main engine shaft 51 separate from but coaxial with shaft 24. Between these two shafts there is mounted a disc 52, from which a central pin 53 extends into a corresponding recess in the end of shaft 24 in order to locate the disc and spaced circumferentially around the disc are pins 54 which extend on both sides thereof. The end of the engine shaft 51 terminates in a cup-shaped casing 55 which houses a number of radially disposed leaf springs 56 which are all anchored at their inner ends to shaft 51 and are equi-angularly disposed within the casing 55. Another housing 57 which houses similar leaf springs 58 extends from a boss 59 rotatable on shaft 24 and the inner ends of the springs 58 are anchored to that boss. Each pin 54 will lie between a spring 56 on one side of disc 52, and a spring 58 on the other side thereof, so that engine torque is transmitted to disc 52 through springs 56 via pins 54 and from the latter via springs 58 to casing 57.

Mounted on casing 57 is a centrifugal clutch member indicated as a whole by reference numeral 60 and this member co-operates with a clutch casing 61 the boss 62 of which is secured to and rotates with shaft 24. The centrifugal clutch 60, 61 is preferably so adjusted that at idling speeds of the power units 17 rotation of engine shafts 51 is imparted only to casings 57 which rotate idly on their shafts 24. At any predetermined speed higher than idling speed the centrifugal clutch 60, 61 can be adjusted to operate so that the engine drive is then transmitted from shaft 51 to shaft 24 and the mechanism comprising the parts 52 to 58 constitutes a flexible drive between each drive unit and its associated shaft 24. Thus any lack of synchronism between one power unit and another will be accommodated by this flexible drive and it will be understood that the power units are designed to be as nearly identical as possible so that only slight hunting will have to be accommodated by the flexible drives.

A throttle control lever 75 will be provided at a position conveniently situated relatively to the steering wheel and a rod 76 is shown by which the throttle control lever will be coupled to the engine throttle but as the throttle valve and the actual coupling constitute no part of the invention and are themselves well understood, it is believed that it will be unnecessary to illustrate more than the throttle lever 75 and operation of the connecting rod 76. When this throttle control is adjusted to idling speeds the power units will turn or idle without transmitting any torque to shafts 24. Immediately, however, the throttle is slightly open centrifugal clutches will come into operation and shafts 24 of those power units in operation will commence to rotate and under these conditions the clutch 43 will be engaged to couple wheel 49 to shaft 42, and the indicator will be turned by the engine in company with the tubular support 15 and propeller housing 10. At the same time the propellers 35 will be rotated slightly but as the housing carrying them is rotated about the axis of member 15 there will be no tendency to drive the vessel in any particular direction and it will remain more or less without movement. When it is desired that the vessel should proceed, clutch 43 will be actuated to couple pulley 70 to spindle 42 when the indicator 174 driven by worm 41 through a flexible coupling 77 shows that the axis of the housing 10 is pointing in the desired direction relatively to the fore and aft center line of the vessel, and as soon as this has been effected a throttle can be opened to the required extent. Prior to such opening the engine will have only been idling while rotating the propeller housing through the medium of gears 48, 49. The vessel will now commence to move under power and can be steered by rotating support 15 and with it the housing 10 as required.

Indicator 174 is a simple type of mechanism comprising a train of gears rotating the pointer shown, the gear ratio being so chosen that movement of the pointer always maintains a uniform relationship with the movement of the propeller housing. That is to say, it turns at the same speed as the propeller so as always to indicate the direction of the latter relatively to the fore and aft center line of the vessel.

By means of the indicator also it can be ascertained when housing 10 is in a position so that the axis of the propeller shaft lies athwartships and when this position is attained the drive of the housing 10 can be uncoupled so that the propellers are in the best positions for grounding the vessel.

As a safety precaution propellers 35 are conveniently connected to their shafts by keys which are designed to be sheared by a force which will be less than that which would, supposing the propellers become fouled by any means, damage the driving mechanism.

The casing 25 serves as a means by which oil will flow in the directions indicated by the dotted arrows down through the space between shafts 18 and 19, into housing 10 and up from that housing to an oil outlet indicated at 63. Oil may be circulated through this system which acts as a cooling system by any preferred oil circulating means.

The invention is equally applicable to the case in which two similar sets of propeller driving mechanisms are employed driven respectively from port and starboard engines or engine groups in which case a synchronising coupling will be necessary between the housings 10 in order that their mutual rotation can be controlled.

Any reasonable number of power units such as 17 may be utilised and this enables the required total horsepower output to be made up from a number of relatively low-powered units so that the power required for low speed cruising compared with the maximum speed can be readily obtained by cutting out the required number of power units rather than by running, as is customary, a comparatively large engine at an inefficiently low speed when low speed cruising is desired.

Vessels equipped with this form of drive will not need to be laid up for engine overhauls as the drive can be arranged so that one engine is always spare and ready for coupling into the drive unit. Therefore each engine can be removed for regular overhaul without stopping the vessel.

Engine torque is largely, if not completely, cancelled out by the opposite rotation of the differential gear couplings to the propellers and transmission torque is cancelled out by the use of oppositely rotating concentric shafts. Similarly, hydraulic torque is cancelled out by the use of oppositely rotating pairs of propellers.

Rudder and rudder brackets are eliminated; the under-water resistance and turbulent flow into the screws caused by long propeller shafts and their brackets are eliminated and also dangerous whip and vibration which is usually associated with long propeller shafts.

The invention is not limited to the precise details of construction described in the foregoing. For instance, any other preferred form of resilient drive between the engines and the propellers may be employed and, moreover, any other arrangement for connecting the indicator and the steering wheel with the drive shafts and turning shaft may be provided.

I claim:

1. Propeller driving means for marine vessels comprising in combination at least two coaxial propeller shafts, two coaxial transmission shafts, the axis of which is transverse to that of the propeller shafts, means to drive the transmission shafts in opposite directions, means coupling the transmission shafts respectively with the propeller shafts to rotate the latter in opposite directions, a mounting for the transmission and propeller shafts rotatable about the axis of the transmission shafts, means to transmit continuous rotation to the mounting about the axis of the transmission shafts, and alternative means for producing at will a partial rotation of the mounting in either direction, for the purpose of steering.

2. Propeller driving means according to claim 1 comprising two pairs of coaxial propeller shafts, whereof one pair is in axial alignment with the other pair, a driving coupling between one of the transmission shafts and one propeller shaft of each such pair to drive them in opposite directions and another driving coupling between the other transmission shaft and the other propeller shaft to drive them also in opposite directions, whereby the propellers considered from one end of the propeller axis to the other are driven alternately left- and right-handedly.

3. Propeller driving means according to claim 1 having a mounting for the transmission and propeller shafts comprising a turning shaft, combined with a power drive for continuously rotating the said turning shaft.

4. Propeller driving means according to claim 1 having a mounting for the transmission and propeller shafts comprising a turning shaft, combined with a power drive for continuously rotating the said turning shaft, and means for coupling at will the turning shaft with a power transmitting element comprising part of the propeller drive.

5. Propeller driving means according to claim 1, combined with a tubular housing which encloses the transmission shafts and constitutes a turning shaft, a double-ended streamline housing enclosing the propeller shafts attached to the lower end of the tubular housing and propellers mounted in said streamline housing and formed with bosses each of which constitutes a component part of the streamline housing.

6. Propeller driving means according to claim 1 combined with a plurality of power units coupled to the transmission shafts through gearing.

7. Propeller driving means according to claim 1 combined with a power unit and a flexible coupling operative between said power unit and the propeller shafts.

8. Propeller driving means according to claim 1 combined with a plurality of power units and a flexible coupling between each power unit and the propeller shafts.

9. Propeller driving means according to claim 1 combined with a power unit operatively connected to drive the propeller shafts and a centrifugal clutch constituting part of the operative connection, such that the drive will not be transmitted to the propellers until a predetermined torque has been attained.

10. Propeller driving means according to claim 1 combined with a plurality of power units each operatively connected to drive the propeller shafts combined with a centrifugal clutch constituting an element in the operative connection of each power unit with the propeller shafts.

11. Propeller driving means according to claim 1 having a mounting for the transmission and propeller shafts comprising a turning shaft, a power drive for said turning shaft, an indicator and means coupling the indicator with the turning shaft so that the angular position of the latter in relation to the fore and aft center line of the vessel will be shown.

12. Propeller driving means according to claim 1 combined with a housing enclosing the transmission and propeller shafts and means enabling oil to circulate through said housing.

13. Propeller driving means for marine vessels comprising in combination two pairs of aligned propeller shafts, two transmission shafts coupled respectively to corresponding pairs of propeller shafts, whereby the propeller shafts of each pair are driven in opposite directions, a power drive for the transmission shafts to rotate them in opposite directions, a housing enclosing the transmission and propeller shafts, a part of which is coaxial with the propeller shafts and transverse to that part of the housing containing the propeller shafts, and constitutes a turning shaft, an operative connection between the power drive and the turning shaft, a manually controlled drive for the turning shaft, and means for selectively coupling either the power drive or the manually controlled drive to the turning shaft.

14. Propeller driving means according to claim 1 combined with a power unit operatively connected with the transmission shafts, said operative connection comprising a flexible coupling and also a centrifugal clutch.

15. Propeller driving means according to claim 1 combined with a plurality of power units each operatively connected with the transmission shafts, said operative connections each comprising a flexible coupling and also a centrifugal clutch.

NOEL PEMBERTON BILLING.